No. 651,949. Patented June 19, 1900.
T. R. LILLIE.
SCREW HOLDER AND DRIVER.
(Application filed Oct. 5, 1899.)

(No Model.)

Witnesses,

Inventor
Theron R. Lillie
Dewey Strong & Co.
atty

UNITED STATES PATENT OFFICE.

THERON R. LILLIE, OF LODI, CALIFORNIA.

SCREW HOLDER AND DRIVER.

SPECIFICATION forming part of Letters Patent No. 651,949, dated June 19, 1900.

Application filed October 5, 1899. Serial No. 732,656. (No model.)

*To all whom it may concern:*

Be it known that I, THERON R. LILLIE, a citizen of the United States, residing at Lodi, county of San Joaquin, State of California, have invented an Improvement in Screw Holders and Drivers; and I hereby declare the following to be a full, clear, and exact description of the same.

My invention relates to a device for holding and driving screws.

It consists of curved arms having the upper ends fulcrumed to a carrier which is bored centrally so as to slide freely upon the shank of the screw-driver. These arms are curved outwardly, then inwardly, and at the lower end are formed with semisockets of a shape adapted to grasp the shank and head of a screw. A bar centrally perforated so as to be freely slidable upon the screw-driver shank has slots made in its outer end, through which the sides of the screw-holding arms pass, and a spring fixed to the fulcrum bar or carrier presses against this slotted bar so as to normally close the jaws. By drawing back this slidable slotted bar the jaws will be opened to admit a screw, and the point of the screw-driver being in line with the slot in the head of the screw will engage it, so that the screw may be turned, being steadied by the supporting parts. Connected with this head are arms extending down upon each side and adapted to contact with the surface into which the screw is being inserted after the screw has been driven sufficiently to be properly supported in the wood, and this contact forces the slide-bar back and automatically opens the jaws to allow the screw-driver to advance through them and complete the setting of the screw in place without special manipulation.

Figure 1:
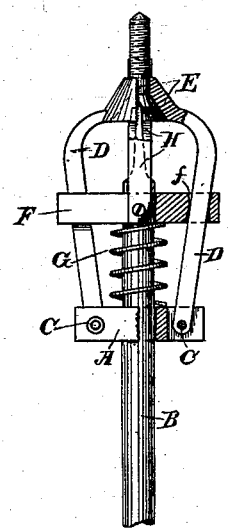
Figure 2:
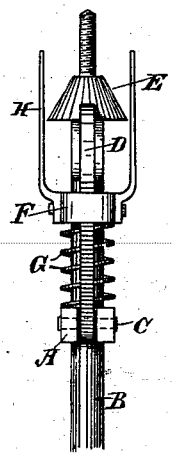

Referring to the accompanying drawings, Figure 1 is a side view of my holder and connections. Fig. 2 is an end view of the same.

A is a bar having a central hole of sufficient diameter to admit the shank B of a screw-driver to slide freely through it. The ends of this bar are slotted and have transverse pivot-pins, as at C. These pivot-pins pass through the rear ends of arms D, which are thus fulcrumed and turnable on the pins. These arms diverge from their fulcrum-points upon each side of the shank of the driver, and from their widest point of divergence they again converge and have formed at their ends where they approach each other the conical screw-holding heads E, the interiors of which are shaped to fit the head and shank of the screw, while the exterior is tapered, as shown.

F is a bar having a central hole freely slidable upon the shank of the screw-driver and having its outer ends formed with holes or channels *f* of such shape as to fit the arms D and to slide freely thereon.

G is a spiral spring, one end of which is fixed to the bar A, and the interior diameter of the spring is such that the shank of the driver can be easily passed through it. The opposite end of the spring presses upon the bar F, and by its pressure the bar sliding upon the diverging arms D tends to close the points E toward each other.

When it is desired to introduce the screw, by placing the thumb upon the bar A and pressing with the fingers upon the slide F the latter will be drawn up on the arms D and will open them about their fulcrum-pins C, thus separating the points sufficiently to admit the head and shank of the screw. By releasing the bar F it is forced outward by the spring, and, sliding upon the divergent arms D, it will close the points toward each other until they grasp the screw and hold it firmly. This may be done at any time, either while the device is fitted upon the shank of the screw-driver or when it is entirely removed therefrom, and in the latter case the screw-driver is afterward passed through the holes in the bars A and F and its point will engage with the slot across the head of the screw. The shank of the driver may then be turned in any usual or well-known manner, and the screw will be forced into the wood until it is supported by the pressure of the wood upon its sides. In order to automatically release it from its holder, I have shown arms H fixed to the bar F and projecting upon each side of the holding-points E. These arms extend sufficiently beyond the holders E so that when the screw has been inserted far enough to be properly supported by the wood these arms will contact against the surface, and a further turning of the screw will cause these arms to force the bar F back against the tension of the spring G, and thus open the jaws to allow the head of the screw and the driver to pass out through them, and the screw can thus be seated without any other handling or operation being necessary.

Having thus described my invention, what I claim as new, and desire to secure by Letters Patent, is—

1. The combination with a screw-driver of an independent screw-holding device, comprising a frame composed of two transverse centrally-perforated bars freely slidable upon the shank of a driver, one of said bars having open slots at its end and the other having closed slots, divergent side bars passing through the closed slots having one end of each fulcrumed in the open slots of the first-named bar, said arms having their outer ends converged and formed to grasp and hold the head and shank of a screw and a spiral spring fixed to one of the transverse bars and pressing upon the other to normally separate said bars, and close the holding-jaws of the side arms toward each other.

2. A screw holding and driving device consisting of arms fulcrumed at one end to a transverse bar freely slidable upon the shank of a screw-driver, said arms diverging from their fulcrum-points outwardly, and then converging and formed into jaws to grasp the head and shank of a screw, a second bar having closed slots at the ends through which the divergent arms pass and are freely slidable, and a central hole through which the shank of the screw-driver is freely slidable, a spiral spring acting to normally separate the bars and close the jaws, said jaws being opened by compressing the spring and moving the bars toward each other.

3. A screw holding and driving device, consisting of arms having jaws at one end adapted to clasp the head and shank of a screw, said arms first diverging from the jaws and afterward converging and having their opposite ends fulcrumed to a transverse bar having a central hole through which the shank of a screw-driver is freely slidable, a second bar intermediate between the fulcrum-bar and the jaws having closed slots at its ends, fitting and slidable upon the inclined arms of the holding-jaws, a spring interposed between the bars and acting to normally separate the bars and close the jaws together, arms fixed upon the intermediate bar extending beyond the holding-jaws so as to contact with the surface into which the screw is being driven, and force the slidable arm back against the tension of the spring, whereby the jaws are opened to allow the point of the driver to advance through them and complete the seating of the screw.

4. The combination with a screw-driver and an independent screw-holding mechanism, of means carried by said device and adapted to engage the part operated upon to automatically trip the screw-holding devices and thereby release the screw.

In witness whereof I have hereunto set my hand.

THERON R. LILLIE.

Witnesses:
O. J. HEMPHILL,
C. L. NEWTON.